United States Patent [19]

Sager

[11] Patent Number: 4,745,852
[45] Date of Patent: May 24, 1988

[54] APPARATUS FOR MAKING A PREDETERMINED QUANTITY OF A BREWED BEVERAGE, IN PARTICULAR COFFEE

[75] Inventor: Peter Sager, Boppelsen, Fed. Rep. of Germany

[73] Assignee: HGZ Maschinenbau AG, Zurich, Switzerland

[21] Appl. No.: 745,300

[22] Filed: Jun. 14, 1985

[30] Foreign Application Priority Data

Jun. 15, 1984 [DE] Fed. Rep. of Germany ....... 3422290

[51] Int. Cl.⁴ .............................................. A47J 31/00
[52] U.S. Cl. ...................................................... 99/280
[58] Field of Search ................. 99/280, 281, 282, 283, 99/288, 290, 279, 291, 289 R; 426/433

[56] References Cited

U.S. PATENT DOCUMENTS

| Re. 22,879 | 5/1947 | Peters | 99/282 |
| 1,473,898 | 11/1923 | Bossini | 99/291 |
| 2,639,078 | 5/1953 | Karlen | 99/282 |
| 2,827,845 | 3/1958 | Richeson | 99/282 |
| 3,034,417 | 5/1962 | Bunn | 99/283 |
| 3,179,035 | 4/1965 | Lockett | 99/282 |
| 3,218,955 | 11/1965 | Lorang | 99/281 |
| 3,348,468 | 10/1967 | Eisendrath | 99/282 |
| 3,596,588 | 8/1971 | Moss | 99/282 |
| 4,098,175 | 7/1978 | Fierz | 99/289 R |
| 4,412,481 | 11/1983 | Oota | 99/281 |

FOREIGN PATENT DOCUMENTS 596091 8/1925 France ................................. 99/291

Primary Examiner—Robert W. Jenkins
Attorney, Agent, or Firm—Thomas & Kennedy

[57] ABSTRACT

An apparatus for making a predetermined quantity of a brewed beverage, in particular coffee, is provided with a device for heating the brewing water and with a batchwise-operating automatic brewing apparatus. As the collection vessel for a complete brewed charge a carafe (12) is provided which is located on a supporting base (13) at the outlet (11) of the apparatus and is arranged so as to be removable. The capacity of the carafe (12) is matched with the volume of the brewed charge.

1 Claim, 1 Drawing Sheet

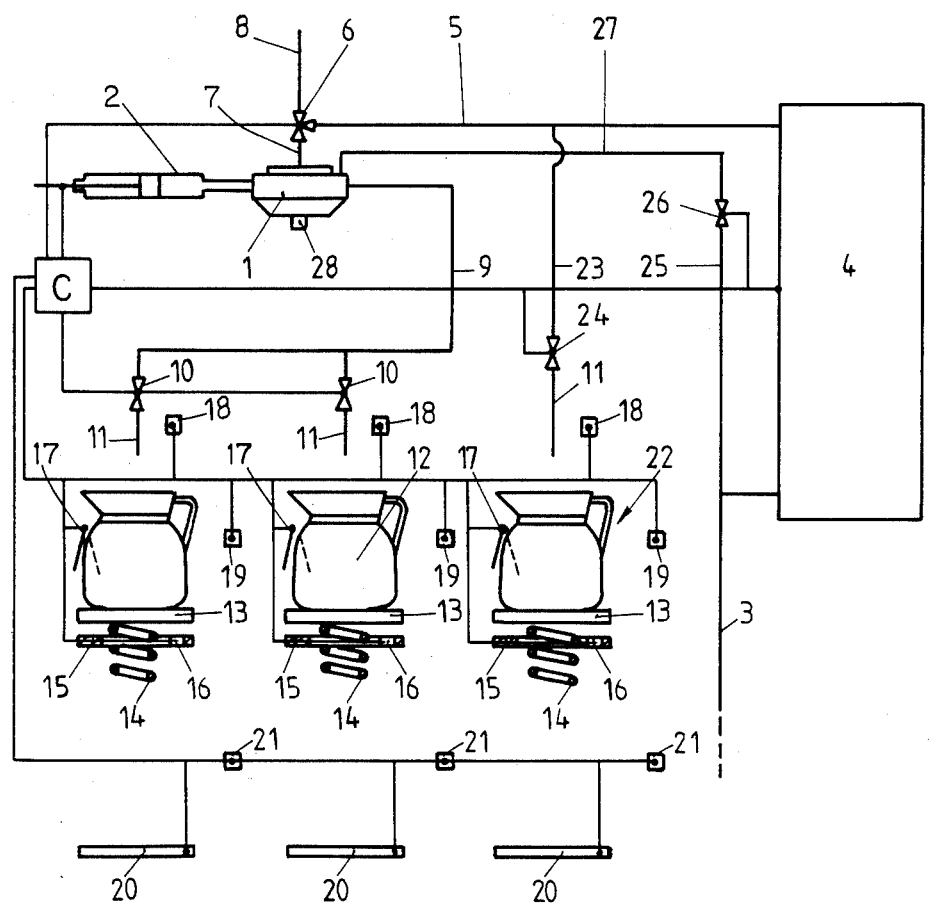

APPARATUS FOR MAKING A PREDETERMINED QUANTITY OF A BREWED BEVERAGE, IN PARTICULAR COFFEE

BACKGROUND OF THE INVENTION

The invention relates to an apparatus for making a predetermined quantity of a brewed beverage, in particular coffee, having a device for heating the water for brewing a batchwise-operating automatic brewing apparatus, which is followed by a collection vessel for the charge to be brewed, an inlet valve in front of the brewing apparatus and an outlet valve behind the brewing apparatus as well as a control device. Apparatuses of this type are used for making available relatively large quantities of freshly brewed coffee and, generally in addition, corresponding quantities of hot water for making tea.

An apparatus of the type described at the outset is known from German Offenlegungsschrift No. 2,526,570. This automatically operating machine is also referred to as an automatic machine for making large quantities of fresh coffee. This apparatus has a batchwise-operating, automatic brewing device, the brewing chamber being followed by three collection vessels each of which is provided with a lower and upper level probe. The charge to be brewed is determined by the capacity of each collection vessel or, respectively, by the arrangement of the level probes, so that each vessel is suitable for receiving a complete brewed charge. The freshly brewed coffee can be drawn off at an outlet via appropriate outlet valves. This known automatic machine for making large quantities of fresh coffee is very variable with regard to the volume of the quantities of coffee to be drawn off, i.e. it is possible to fill both individual cups and pots and carafes. However, this is possible only with monitoring by an operator. The three collection vessels are connected to the apparatus via an involved control device which follows a certain sequence during filling, i.e. during the passage of the individual charges to be brewed, and during removal of the coffee in a manner such that freshly brewed coffee is not mixed with coffee already present in the collection vessel. This advantage is cancelled out by the expenditure for the three collection vessels. As a result of this intermediate storage of the coffee, the latter when poured is not completely fresh, in particular when the quantities removed per unit time are only relatively small.

Furthermore, infusion apparatuses are known which operate without pressure and have a filter pan. Apparatuses of this type are not automatic machines but apparatuses in which appropriate procedures, thus for example inserting the filter paper and metering in the powder, have to be carried out for each brewing operation, i.e. for each charge. The filter pan has to be emptied and cleaned after each charge. Using such apparatuses it is of course also possible to make a carafe of coffee, in particular when the capacity of the carafe corresponds to the brewed charge. These known apparatuses are comparatively inexpensive to manufacture but expensive to operate, since they require the presence of an operator during the brewing operation. The performance of the apparatus is limited. Removal of a carafe, partially filled with coffee, from the apparatus does not interrupt the brewing operation so that the coffee continues to flow out.

German Pat. No. 1,454,224 discloses an automatically operating apparatus, that is an apparatus in which the individual brewing operations take place batchwise and automatically controlled by a control device. The brewing chamber is followed by a first collection vessel which is intended for receiving a charge of brewed coffee. The charge to be brewed is determined by two level probes arranged in the collection vessel. Downstream from the collection vessel is arranged a large-capacity storage container, as a warming container, which is likewise fitted with level probes which, when a corresponding quantity of brewed coffee is drawn off, can trigger a further brewing operation, so that a certain quantity of coffee can always be kept available. The disadvantage of this apparatus is that here too the brewing chamber is followed by various containers and the brewed coffee is transferred from one container into the other so that the coffee ultimately poured out is not entirely freshly brewed. Moreover, the disadvantage arises that freshly brewed coffee transferred from the collection vessel into the storage container is always mixed with stale coffee in the storage container. The latter has a tap at its outlet, which can be actuated in a corresponding manner. In this way it is also possible to use this apparatus for drawing off a carafe of coffee. However, in this case too it is necessary for the operator to be present.

German Offenlegungsschrift No. 2,048,163 discloses a dispensing apparatus for beverages, in particular coffee, in which a large-capacity storage container is followed by a measuring container which is fitted with level probes at varying heights, corresponding to the particular desired quantity to be drawn off for an individual cup or for a pot. For placing the individual cup or the pot underneath the outlet of an appropriate valve a supporting base is provided which is mounted on a spring so that, when an empty individual cup or a pot is placed on top of it, this supporting base is lowered to varying extents as a function of the different weight of the particular empty vessel. This at the same time provides for a switch which responds to the weight or, in another embodiment, to the shape of the particular container to be filled, so that the particular level probe selected in the measuring container transfers a corresponding quantity of coffee from the storage container first into the measuring container and then from the latter into the individual cup or the pot. This sensor hence serves for determining whether an individual cup or a pot has been placed underneath the outlet and accordingly and in conjunction with the measuring container determines the quantity flowing out. The sensor is thus an identification sensor. However, a further sensor is also provided which actuates a position switch connected into the circuit of the solenoid valve which controls the flow from the storage container into the measuring container and from the latter into the individual cup or the pot. This switch is a sort of position switch since it only permits transfer of coffee from the storage container into the measuring container when an individual cup or a pot is in position on the supporting base. However, the individual brewing operations, as are necessary in making coffee, are unaffected by either the identification sensor or the position switch.

The common feature of all the known prior art apparatuses of the types under discussion here is that the brewing apparatus or the actual brewing chamber is followed by at least one, frequently however more than one, collection vessel(s) also of different size within the apparatus. This reveals a certain unyielding way of thinking in which it is considered necessary for the brewing chamber to be followed, first of all, by a firmly installed collection vessel, so that the brewed charge of coffee can also be received. The use of such fixed collection vessels is of course particularly obvious when the apparatuses have a relatively large output and/or when they operate automatically.

SUMMARY OF THE INVENTION

The invention is based on the object of developing further an automatically operating apparatus of the type described at the outset in a manner such that an empty carafe can be filled with freshly brewed coffee unattended and without batchwise brewing preparation in each case, so that the carafe merely needs to be removed to be ready for pouring out the freshly brewed coffee which is not mixed with stale coffee. The invention aims at improving service, in particular in breakfast rooms of large hotels, so that the work of the operator is substantially facilitated by the fact that, although a brewing operation still has to be triggered at some time, the empty carafe is filled with the freshly brewed coffee unattended.

This object is achieved, according to the invention, when a carafe is provided, as a collection vessel for a complete brewed charge, which carafe is located on a supporting base at the outlet of the apparatus and is arranged so as to be removable, and when the capacity of the carafe is matched with the volume of the brewed charge. The invention thus completely turns away from the prior art and, in an unconventional manner, dispenses with the fixed arrangement of collection vessels downstream of the brewing chamber within the machine. Instead, the carafe which is in any case necessary is used as the collection vessel for the brewed charge and as a measuring container for the latter. Of course, the carafe serves at the same time also for pouring out coffee as previously. The new design not only simplifies the apparatus by dispensing with collection vessels or intermediate storage containers downstream of the brewing chamber but also makes it possible at the same time for mixing of freshly brewed coffee with stale coffee to be avoided. Since there is no intermediate storage container in the apparatus the brewed coffee passes from the brewing chamber into the carafe in the shortest way possible. Hence, extremely freshly brewed coffee is available there for pouring out. The guest can not only detect this by the aroma but also by the manner in which the coffee flows out. The guest gains the correct impression that the coffee flowing into the carafe has been brewed immediately beforehand. Further, it is advantageous that the control device for the apparatus is made simpler to the extent that the activation of intermediate storage containers, of appropriate valves in front of and after these intermediate storage containers and of level probes in these intermediate storage containers is omitted. The saving of space for the intermediate storage containers additionally permits a smaller size of the apparatus. Finally, the apparatus is very easy to use. It is merely necessary now to place an empty carafe underneath the outlet and to start a charge to be brewed by pressing a button. Depending on the machine design, for example two brewing points can be provided which are operated in succession by a stored start pulse so that the operator can, during the two brewing operations and the filling of the carafes, attend to other jobs, for example refilling or supplying fresh breakfast rolls etc. It is also possible, because of the great simplicity of the apparatus, for the guest to serve himself, by the operator merely bringing a carafe with freshly brewed coffee to a hotplate at his breakfast table. The invention is thus based on the idea of directly filling a carafe by means of an automatic brewing machine and of using the carafe both as a collection vessel for the brewed coffee charge and for measuring the charge. It is obvious that the control device of the apparatus is switched in such a manner that a brewing operation can only be effectively triggered when a carafe has been placed underneath the outlet. The invention also has the advantage that cleaning of the apparatus is simplified. It is merely necessary to wash out the brewing chamber of the brewing apparatus. Cleaning of the collection vessel and of the warming container is omitted since these are not present.

The control device has a position switch to indicate that a carafe has been placed on the supporting base. This position into switch is connected the circuit such that a brewing operation can only be started when a carafe has actually been placed on the supporting base. This position switch can be designed in various ways, for example as a function of the shape of the carafe or even as a function of the weight of the empty carafe. It is also possible for a photoelectric barrier or the like to be provided. The control device with the position switch is otherwise designed so that the outlet valve closes when an incompletely filled carafe is accidentally removed, that is to say during the course of a brewing operation, so that the remainder of the charge being brewed does not flow onto the machine.

For determining the charge to be brewed itself, there are various possibilities. One option is that the control device has a weight-sensitive switch which is arranged on the supporting base, responds to the weight of a carafe filled with a complete brewed charge and then closes the outlet valve. Hence, metering the charge here takes place with the aid of the carafe by means of weight sensing. This weight-sensitive switch is not adapted to the weight of an empty carafe but to the sum of the weight of the empty carafe and the weight of the brewed charge, that is to say overall to the weight of the full carafe. This at the same time also ensures that, in the event of an almost empty carafe having been placed accidentally on the supporting base and a brewing operation being triggered, the carafe cannot overflow. The charge to be brewed can also be determined in another way, for example by the control device having a device for measuring a charge of water to be brewed, in particular cold water, as is known from, for example, German Auslegeschrift No. 1,778,190. However, this increases the expenditure of the apparatus.

The apparatus has a switch for triggering a brewing operation involving one charge to be brewed, so that merely placing an empty or full carafe on the supporting base is insufficient, and is deliberately insufficient, to trigger a brewing operation. The reason for this is that the supporting base underneath the outlet is also designed as a hot-plate, so that it should be possible for the brewed charge flowing in unattended not to have to be removed immediately from the supporting base but to be left on the latter until needed. If on the other hand a relatively large quantity of coffee is required within a short period the full carafe can of course be removed immediately, an empty carafe placed in position and a new brewing operation triggered.

The apparatus can, in addition to the supporting base underneath the outlet, have one or more further supporting bases, designed as hot-plates, in order to be able to put down a carafe filled with a complete brewed charge or a partially emptied carafe.

The apparatus can also be designed in such a way that a single automatic coffee-brewing apparatus is followed by two supporting bases underneath two outlets with one outlet valve each and that the control device has a memory for receiving and processing a start pulse for a second brewing operation. This makes it possible, therefore, to fill two carafes successively and unattended with one complete brewed charge each and using only one automatic brewing apparatus so that at the end of this unattended period of time twice the quantity of coffee is available for pouring out.

To make it possible to prepare tea at the guest's table by using tea bags or the like, the apparatus can have a hot-water brewing point with supporting base and position and weight-sensitive switches. In this case also a charge of hot water is drawn off in the same way as has been described above with regard to coffee. The only difference is that the hot water is not passed through the brewing apparatus but is drawn off directly from the device for heating the water for brewing. It is furthermore obvious that the apparatus is ready for dispensing coffee or hot water for making tea only when the water in the heater has reached the prescribed minimum temperature of 80° C. Likewise, a safety device is fitted which ensures that the corresponding amount of coffee powder is indeed present in the storage container intended for the purpose when a brewing operation is triggered.

BRIEF DESCRIPTION OF THE DRAWINGS

The invention is described in more detail with reference to a preferred exemplary embodiment. The drawing shows essential components diagrammatically, where they are necessary for clarity.

DETAILED DESCRIPTION

The apparatus has a batchwise-operating automatic brewing apparatus having a brewing chamber 1 and a coffee powder feed device 2. An instantaneous water heater 4 is connected to a fresh water line 3 for cold water. Instead of the instantaneous water heater 4, another device for heating or warming of the water can also be provided. A line 5 for hot water for brewing leads from the instantaneous water heater 4 to an inlet valve 6 designed as a three-way valve, from which on the one hand a line 7, which leads into the brewing chamber 1, branches off and to which is connected on the other hand a line 8 which leads to the atmosphere as a venting line. To the brewing chamber 1 is connected a line 9 through which the brewed coffee passes into an outlet 11 via an outlet valve 10 in the event of a brewing operation. A carafe 12 standing on a supporting base 13, which is supported on a spring 14, is arranged underneath the outlet 11. The force of the spring 14 is adjustable so that the supporting base 13 with the carafe 12 can be lowered with increasing weight due to coffee flowing in. A weight-sensitive switch 16 is provided underneath the supporting base 13, for example on a fixed stop ring 15. The spring 14 is adjusted so that a carafe filled with coffee presses, due to its weight, the supporting base 13 onto the stop ring 15 and thereby actuates the weight-sensitive switch 16. This weight-sensitive switch 16 ends the brewing operation of the brewed charge by closing the outlet valve. In the region of the supporting base 13 a position switch 17 is also provided on the machine which scans for example the shape and hence permits the generation of a signal indicating whether or not a carafe 12 has been placed on the supporting base 13. The non-occupied position is shown in broken lines while the carafe 12 pivots the position switch 17 into the fully drawn position due to its absence. The position switch 17 is connected into the control device of the machine in a manner such that a brewing operation can only be triggered when a carafe 12 has been placed on the supporting base 13. If on the other hand the carafe is accidentally removed from the supporting base during the course of a brewing operation, the position switch 17 interrupts the brewing operation and the further flowing out of brewed coffee. It is obvious that the outlet valve 10 is also designed as an electric solenoid valve. One brewing point of the supporting base 13 described is associated with a switch 18 for starting a brewing operation, which is arranged in the circuit of the position switch 17. The switch 18 can also be fitted a point other than on the apparatus in order additionally to permit, where appropriate, remote control. The switch 18 can also be fitted with a switch clock so as to be able to preselect a time after which a brewing operation will be triggered. The supporting base 13 is designed as a hot-plate. It is switched on by means of a switch 19. The position switch 17 can also be arranged in the circuit of this switch 19, so that it is ensured that the supporting base 13 is only heated when a carafe 12 has actually been placed on the latter.

As shown, preferably two brewing points for coffee are provided which together follow a single brewing apparatus with the brewing chamber 1 and which are to this extent of identical design.

Further hot-plates 20 with switches 21 can be provided at another point on the apparatus, so that already filled carafes 12 can be put down there.

The apparatus has a tea water outlet point 22 which per se is designed in the same way as the described outlet points for the coffee water. The only difference is that, obviously, the brewing chamber 1 is by-passed in that a hot water line 23 is connected directly to the line 5 and leads to the outlet 11 via a solenoid valve 29. Here again, the control device is designed and switched in such a manner that the withdrawal of hot water required for making tea can only take place when the position switch 17 has responded to a carafe 12 being placed on the supporting base 13. Actuation of the switch 18 starts the charge, i.e. opens the solenoid valve 24. When the complete charge has flowed into the carafe 12 the supporting base 13 is lowered until the switch 16 is actuated which determines the end of the charge and hence also the quantity of the charge.

For cleaning purposes, in particular for washing the brewing chamber 1, a cold water line 25 is also provided which leads to a washing valve 26, from which a line 27 branches off to the brewing chamber 1. The brewing chamber 1 is normally closed, in conventional manner, by means of a flushing cone which can be actuated via a lifting cylinder valve. An outlet 28 is formed on the brewing chamber 1 for rinsing the coffee powder which has flowed out and for cleaning and pre-heating purposes.

As can be seen, the apparatus is provided with for example two coffee brewing points with a heating element and a tea water outlet point with a heating element and with three further hot-plates, which can be switched individually. The cleaning system works automatically so that no components have to be disassembled. The apparatus can for example be designed so that the carafe 12 can receive a brewed charge of 1.6 l. It is possible with this apparatus as defined to prepare 64 l/hour of coffee and additionally about 32 l/hour of hot water for tea. The automatic brewing apparatus is also associated with a container designed for receiving about 2.5 kg of coffee powder which is passed automatically by the coffee powder feed device 2 to the brewing chamber 1 during each brewing operation.

The apparatus can be operated as follows: in order to prepare appropriate charges to be brewed or to render the apparatus ready for operation, for example in a breakfast room of a large hotel, the coffee powder is first poured in and the instantaneous water heater 4 switched on. The apparatus is ready for operation when a temperature of at least 80° C. has been reached. Where appropriate, a washing procedure of the brewing chamber 1 also takes place.

For filling a carafe 12 with hot water for making tea, the carafe 12 is placed on the tea water outlet point 22 and hence on the supporting base 13 at that point and the heating element of the supporting base 13 is switched on by actuating the switch 19. Putting down the carafe 12 has actuated the position switch 17 so that by pressing the switch 18 the start of a hot water charge can be initiated in that the solenoid valve 24 is opened. The operator can then attend to other jobs since the hot water flows automatically into the carafe 12. The charge is determined or ended by the weight of the full carafe 12 in conjunction with the weight-sensitive switch. This takes place automatically by the solenoid valve 24 being closed. The carafe is thus ready for use and is maintained at the temperature by the heating element which continues to be switched on. If the carafe 12 is removed from the tea water outlet point 22 before it has received a complete charge, this also stops the automatic outflow of hot water by means of the position switch 17 and the solenoid valve 24. The control device is switched so that merely placing a carafe 12 in position again does not result in renewed outflow of hot water but so that the switch 18 has to be actuated in addition for this purpose. It is thus possible completely to fill a carafe 12, which is for example only half full, with hot water, that is to say so that it additionally receives a residual charge the quantity of which is smaller than the quantity of a complete hot water charge. Where possible, the carafe should not be removed during the dispensing of hot water and also not pressed downwards unless this procedure is deliberately intended when a very small quantity of hot water is required which is, in other words, smaller than a complete charge.

Two brewing points are available for brewing fresh filter coffee. As long as neither of the two brewing points is occupied by a carafe 12 no brewing operation can be started. However, placing an empty carafe 12 on the supporting base 13 actuates the relevant position switch 17 so that by actuation the switch 18 a brewing cycle, i.e. a brewing operation with one brewed charge, can be started or initiated. For this purpose, the amount of coffee powder, intended for one charge to be brewed, of the coffee powder feed device 2 is transported into the brewing chamber 1 via the automatic brewing apparatus. Subsequently, the inlet valve 6 is automatically adjusted so that it connects the line 5 with the line 7 and shuts off the line 8. At the same time, the outlet valve 10 in front of the outlet 11 of the brewing point is opened, the brewing point being occupied by the particular carafe 12 and its switch 18 having been actuated. The brewing operation of the charge to be brewed can take place unattended, i.e. the operator can turn to other jobs in the breakfast room. The freshly brewed coffee flows directly from the brewing chamber 1 into the carafe 12, via the line 9, the open outlet valve 10 and the outlet 11. It can be seen from the manner in which the brewed coffee flows out of the outlet 11 that this coffee does not originate from an intermediate storage container inside the apparatus but comes directly from the brewing chamber, because, at the beginning of a brewing operation, the coffee powder is irregularly moistened and the outflow of the brewed coffee also differs with regard to time.

While the first charge to be brewed is on its way or has just been started, a further empty carafe 12 can be placed on the other brewing point. By pressing the associated switch 18, this second brewing charge is pre-programmed, that is to say is transferred to a memory. Since only one brewing apparatus with a brewing chamber 1 is provided/the two filling operations of the carafes 12 can take place not simultaneously but only in succession. However, even during this entire period of time, during which two charges are brewed and hence two carafes filled, the operator does not have to be present for monitoring purposes. The second brewing charge which has already been programmed but not yet started, or even already started, can be ended or cancelled by removing the particular carafe 12. Of course, this removal should if possible not take place if the second brewing charge is already flowing out. Such an unintentional removal of an incompletely filled carafe 12 however leads to the outlet valve 10 being closed via the position switch 17 so that the remaining brewed coffee of a charge does not flow onto the apparatus. One or two brewing charges are in each case terminated by weight-sensing with the aid of the weight-sensitive switch 16 so that this termination takes place without monitoring or actuating the apparatus. A carafe 12 filled with a brewed charge can be placed on the hot-plate 20, the switch 21 advantageously being actuated. Instead of the switch 21, the hot-plates 20 can also be designed similarly to the supporting bases 13 and actuated by a weight-sensitive switch 16 which responds to a weight slightly larger than the weight of an empty carafe 12.

DESIGNATION LIST

1=brewing chamber
2=coffee powder feed device
3=fresh water line
4=instantaneous water heater
5=line
6=inlet valve
7=line
8=line
9=line
10=outlet valve
11=outlet
12=carafe
13=supporting base
14=spring
15=stop ring
16=weight-sensitive switch
17=position switch
18=switch
19=switch 20=hot-plate
21=switch
22=tea water outlet point
23=hot water line
24=solenoid valve
25=cold water line
26=washing valve
27=line
28=outlet

I claim:

1. An automatic coffee brewing machine for brewing predetermined quantities of coffee and the like including a heater for heating water, a brewing chamber in communication with said heater for receiving hot water from said heater, water valve means controlling the flow of hot water from said heater to said brewing chamber, a coffee powder feed means arranged to dispense powdered coffee to said brewing chamber, at least two carafe supports for receiving carafes each of a capacity corresponding to the capacity of said brewing chamber, delivery conduit means for dispensing brewed coffee from said brewing chamber directly to one of said carafes without intermediate storage when placed on said carafe supports, brewed coffee valve means for controlling the flow of brewed coffee through said delivery conduit means to said carafes at each carafe support, switch means for operating said brewed coffee valve means at each carafe support responsive to the presence or absence of a carafe at the carafe support and responsive to the quantity of brewed coffee delivered to the carafe, whereby when a carafe is placed on a carafe support coffee powder and hot water are fed to the brewing chamber and the coffee is brewed in the brewing chamber and dispensed to the carafe.

* * * * *